United States Patent [19]
Fry

[11] 3,733,428
[45] May 15, 1973

[54] WIRING HARNESSES AND METHOD OF MAKING SAME

[75] Inventor: William Lawrence Fry, Haughton, England

[73] Assignee: Rists Wires Cables Limited, Newcastle, England

[22] Filed: July 8, 1971

[21] Appl. No.: 160,803

[30] Foreign Application Priority Data

July 11, 1970  Great Britain.....................33786/70

[52] U.S. Cl.................174/72 A, 156/47, 156/178, 156/290, 156/297, 174/117 F
[51] Int. Cl.............................................H02g 3/02
[58] Field of Search.............174/70 C, 72 A, 117 R, 174/117 F, 117 FF, 117 A; 29/203 MW; 156/47, 178, 290, 291, 297

[56] References Cited

UNITED STATES PATENTS

| | | | |
|---|---|---|---|
| 2,958,018 | 10/1960 | Kocmich | 174/117 F UX |
| 3,023,692 | 3/1962 | Crown | 174/72 A X |
| 3,168,617 | 2/1965 | Richter | 174/117 FF |
| 3,210,032 | 10/1965 | Van Slyke | 174/72 A X |
| 3,459,878 | 8/1969 | Gressitt et al. | 174/117 R X |

FOREIGN PATENTS OR APPLICATIONS

| | | | |
|---|---|---|---|
| 197,455 | 4/1958 | Austria | 174/117 R |
| 938,797 | 2/1956 | Germany | 174/117 F |

Primary Examiner—Laramie E. Askin
Attorney—Holman & Stern

[57] ABSTRACT

A wiring harness for a road vehicle includes a plurality of conductive leads each of which includes a conductive core in a synthetic resin sheath. The individual leads of the harness extend side by side wherever possible, and are secured together by means of a synthetic resin backing member which is fused to the sheaths of the leads. The leads are positioned in a predetermined pattern, and the synthetic resin backing member is engaged with the leads. A fusing tool is engaged with the backing member and is operated to fuse the backing member to the sheaths of the leads. The backing member can be a preform in the shape of the harness pattern, or alternatively can be in a number of separate parts individually fused to the leads.

6 Claims, 5 Drawing Figures

PATENTED MAY 15 1973
3,733,428
SHEET 1 OF 2
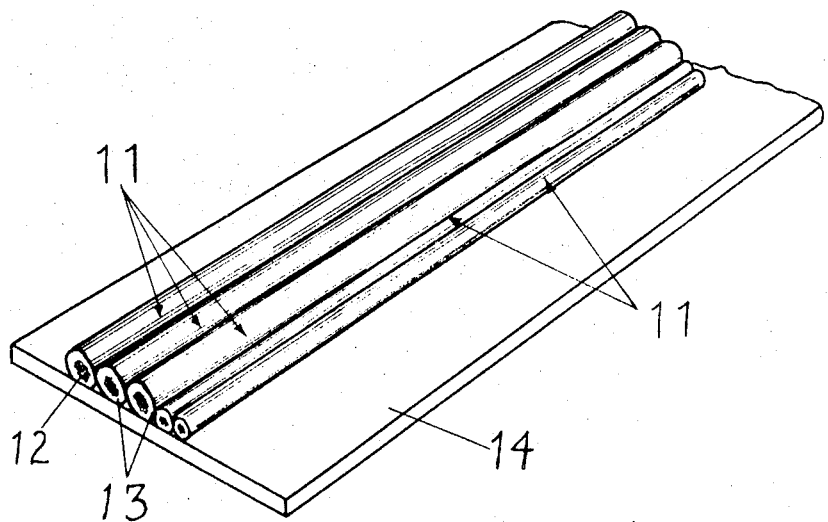
FIG. 1
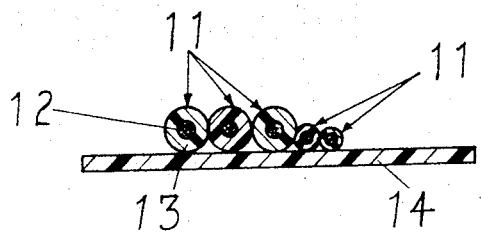
FIG. 2.
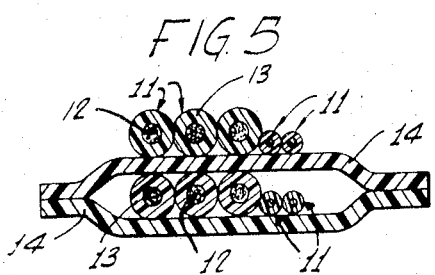
INVENTOR
William Lawrence Fry.

WIRING HARNESSES AND METHOD OF MAKING SAME

This invention relates to wiring harnesses particularly, but not exclusively, for road vehicles.

A wiring harness according to the invention includes a plurality of conductive leads each of which comprises a conductive core in a synthetic resin sheath, and a synthetic resin backing member, said leads being secured in position relative to one another by having their sheaths fused to said backing member.

The invention further resides in a method of manufacturing a wiring harness including the steps of, arranging a plurality of leads, each of which comprises a conductive core in a synthetic resin sheath, in a predetermined pattern, engaging a synthetic resin backing member with the leads, and fusing the backing member to the sheaths of the leads so that the member retains the leads in said pattern.

One example of the invention is illustrated in the accompanying drawings wherein:

FIG. 1 is a perspective view of part of a wiring harness for a road vehicle,

FIG. 2 is a sectional view of the harness part shown in FIG. 1,

FIG. 5 is a sectional view of a modification applicable to the arrangement of FIGS. 1, 3 and 4.

Figure 3:
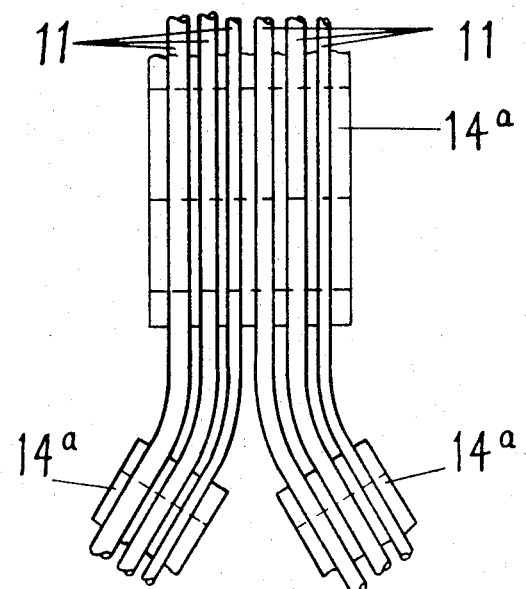
FIG. 3 is an inverted plan view of a modification of the arrangement shown in FIG. 1.

Referring to the drawings, the wiring harness includes a plurality of conductive leads 11 each of which comprises a conductive core 12 within a polyvinyl chloride sheath 13. The leads 11 are arranged in the harness so as to run parallel to one another wherever possible, and where the leads run parallel to one another they are secured to a backing member in the form of a P.V.C. strip 14 by fusing the strip 14 to the sheaths 13 of the leads. The strip 14 is fused to the sheaths at a plurality of spaced points along the lengths of the leads, the leads being arranged side by side. Thus the leads 11 are secured in position relative to one another by the strip 14.

In order to manufacture the harness the leads are arranged in the harness pattern on a former, with the leads side by side rather than in a bundle. A backing member in the form of the P.V.C. strip 14 is laid in contact with the leads, and where the leads extend parallel to one another, and it is necessary to secure the leads together, a radio frequency fusing tool is used to fuse the P.V.C. backing strip to the P.V.C. sheaths of the leads at spaced points along the lengths of the leads. The strip 14 is preformed to the shape of the harness to be produced, and there will of course be regions where it is undesirable to secure the leads to one another. In these regions the leads will not be fused to the strip 14.

In a modification (FIG. 3) the backing member is defined by several separate strips 14a which are fused to different runs of leads in the harness. The strips 14a do not need to be intricately shaped to follow the pattern of the harness since they will be fused to the straight runs of the leads in the harness at spaced points along the straight runs.

Figure 4:
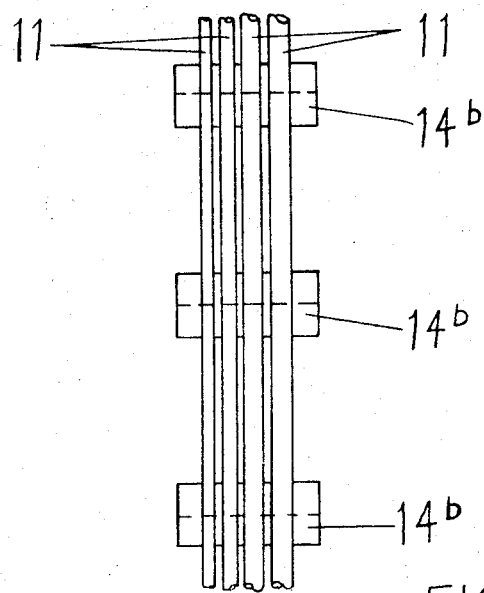
FIG. 4 is an inverted plan view of a further modification of the arrangement shown in FIG. 1.

In a further modification (FIG. 4) the backing member is defined by a plurality of separate P.V.C. pieces 14b which are each laid across the runs of leads 11 and which are each fused to the sheaths of the leads 11. The pieces 14b are spaced apart along the length of the leads 11 of the harness.

It will be appreciated that leads of different diameter can be secured easily to the same backing member, and moreover where two separate sets of leads are secured to respective backing member parts, then the two sets of leads can be positioned one on top of the other, and can be secured together by fusing regions of their respective backing member parts together, as shown in FIG. 5. Where leads of different diameter are to be secured to the same backing member the leads are supported on a resilient pad and the backing member is then engaged with the leads. The fusing tool is then engaged with the backing member at the point at which the leads are supported by the resilient pad, and pressure is applied during operation of the tool to produce the fusion. The tool has a straight edge which engages the backing member, and is not stepped to accommodate the difference in diameter in the leads 11. The application of pressure to the backing member and the leads during the fusing operation deforms the resilient pad, so that the resilient pad accommodates the difference in diameter between the leads 11, thereby ensuring that all the leads are fused to the backing member.

I claim:

1. A wiring harness including a plurality of conductive leads each of which comprises a conductive core in a synthetic resin sheath, and a synthetic resin backing member, said plurality of leads including leads of at least two different diameters, and said leads being secured side by side by having their sheaths fused to said backing member, and wherein a first set of leads in the harness is fused to a first backing member part and a second set of leads of the harness is fused to a second backing member part, the first set extending on top of the second set, and the first and second set being secured together by interconnecting regions of their respective backing member parts.

2. A method of manufacturing a wiring harness, including the steps of arranging a plurality of conductive leads of two different diameters in a predetermined pattern, each lead comprising a conductive core in a synthetic resin sheath, engaging a synthetic resin backing member with the leads to form an assembly, engaging a resilient member with the assembly, and urging the leads and the backing member relatively towards one another by applying pressure to the assembly which deforms the resilient member while fusing the sheaths of the leads to the backing member, the deformation of the resilient member accommodating the differences in diameter of the leads thereby ensuring that all leads are fused to the backing member.

3. A method as claimed in claim 2, further including the step of preforming the backing member to the shape of the harness.

4. A method as claimed in claim 3, further including the step of fusing the backing member to the leads at spaced points along the lengths of the leads.

5. A method as claimed in claim 2, further including the steps of forming the backing member into a number of separate strips, and fusing each strip to respective runs of leads in the harness at spaced points along the length of their respective runs.

6. A method as claimed in claim 2, further including the steps of forming the backing member into a plurality of separate pieces, and fusing each piece to the leads at points spaced apart along the lengths of the leads.

* * * * *